US012770030B2

(12) United States Patent
Samudrala et al.

(10) Patent No.: US 12,770,030 B2
(45) Date of Patent: Oct. 20, 2026

(54) METHOD AND SYSTEM FOR EXCEPTION MANAGEMENT

(71) Applicant: Tata Consultancy Services Limited, Mumbai (IN)

(72) Inventors: Satya Narayana Samudrala, Pune (IN); Veena Deshmukh, Pune (IN); Maitreya Natu, Pune (IN); Vaishali Sadaphal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 649 days.

(21) Appl. No.: 18/342,139

(22) Filed: Jun. 27, 2023

(65) Prior Publication Data

US 2023/0419129 A1 Dec. 28, 2023

(30) Foreign Application Priority Data

Jun. 28, 2022 (IN) ............................. 202221037124

(51) Int. Cl.
*G06N 5/025* (2023.01)

(52) U.S. Cl.
CPC .................................... *G06N 5/025* (2013.01)

(58) Field of Classification Search
CPC ...................................................... G06N 5/025
See application file for complete search history.

(56) References Cited

U.S. PATENT DOCUMENTS 7,836,004 B2 * 11/2010 Roth ..................... G06F 16/215
706/47
9,639,595 B2 * 5/2017 Appanna ............... G06F 16/283
10,467,550 B1 * 11/2019 Gupta ..................... G06N 20/00
10,977,166 B1 * 4/2021 Jaganmohan ............ G06N 5/02
11,093,864 B1 * 8/2021 Reese ................. G06F 16/2379
11,341,410 B1 * 5/2022 Johnson ............... G06N 3/0985
11,373,131 B1 * 6/2022 Venugopal ....... G06Q 10/06395
11,423,680 B1 * 8/2022 Jade ...................... G06F 16/353
(Continued)

OTHER PUBLICATIONS

Gulati, Pooja & Sharma, Amita & Gupta, Manish. (2016). Theoretical Study of Decision Tree Algorithms to Identify Pivotal Factors for Performance Improvement: A Review. International Journal of Computer Applications. 141. 19-25. 10.5120/ijca2016909926. (Year: 2016).*
(Continued)

*Primary Examiner* — Jeremy L Stanley
(74) *Attorney, Agent, or Firm* — Finnegan, Henderson, Farabow, Garrett & Dunner LLP

(57) ABSTRACT

State of the art approaches of exception management are reactive, manual, and intuition-driven. Command center teams often react to exceptions. They also use BI tools which only provide statistical observation, but fail to mine domain-aware insights and actionable recommendations. The disclosure herein generally relates to analyzing process exceptions, and, more particularly, to a method and system for generating a data model to analyze and predict process exceptions. The system generates a data model by using information on rules, associated properties and exceptions, as training data. The data model is further used to process information on different rules to identify exceptions, and then to generate recommendations in response to identified exceptions.

9 Claims, 4 Drawing Sheets

(56) References Cited

U.S. PATENT DOCUMENTS

| | | | | |
|---|---|---|---|---|
| 11,675,651 | B2 * | 6/2023 | Li | G06F 9/5016 714/15 |
| 2007/0219990 | A1 * | 9/2007 | Crivat | G06F 16/283 |
| 2011/0149745 | A1 * | 6/2011 | Filho | H04L 63/1416 370/242 |
| 2016/0048790 | A1 * | 2/2016 | Ritter | G06F 9/546 705/7.26 |
| 2017/0061284 | A1 * | 3/2017 | Amano | G06N 5/025 |
| 2017/0261972 | A1 * | 9/2017 | Vaissiere | G05B 23/0256 |
| 2018/0267523 | A1 * | 9/2018 | Sigtermans | G06F 11/079 |
| 2019/0043070 | A1 * | 2/2019 | Merrill | G06F 9/54 |
| 2019/0066221 | A1 * | 2/2019 | Ashly | G06Q 10/10 |
| 2020/0342369 | A1 * | 10/2020 | Sridhara | G06F 40/30 |
| 2020/0364571 | A1 * | 11/2020 | Xu | G06N 5/01 |
| 2020/0364797 | A1 * | 11/2020 | Halpern-Manners | G06Q 50/182 |
| 2020/0401565 | A1 * | 12/2020 | Saillet | G06F 16/24578 |
| 2021/0012242 | A1 * | 1/2021 | Subbiah | G05B 23/024 |
| 2021/0109503 | A1 * | 4/2021 | Singh | G06N 20/00 |
| 2021/0192412 | A1 * | 6/2021 | Krishnaswamy | G06Q 10/06316 |
| 2021/0271582 | A1 * | 9/2021 | Liu | G06F 11/3495 |
| 2021/0319372 | A1 * | 10/2021 | Watt | G06F 16/212 |
| 2021/0351973 | A1 * | 11/2021 | Ford | H04L 43/067 |
| 2021/0398050 | A1 * | 12/2021 | Dunbar | G06Q 10/06375 |
| 2022/0078071 | A1 * | 3/2022 | Agapitos | H04L 41/16 |
| 2022/0138681 | A1 * | 5/2022 | Newell | G06N 20/00 705/341 |
| 2022/0269664 | A1 * | 8/2022 | Smith | G06F 18/2321 |
| 2022/0277242 | A1 * | 9/2022 | Sahni | G06Q 10/063112 |
| 2022/0405261 | A1 * | 12/2022 | Ma | G06F 16/2272 |
| 2024/0133572 | A1 * | 4/2024 | Kim | F24F 11/64 |
| 2025/0307852 | A1 * | 10/2025 | Balasubramanian | G06Q 10/087 |

OTHER PUBLICATIONS

Chun-Hao Chen et al. "Post-Analysis Framework for Mining Actionable Patterns Using Clustering and Genetic Algorithms," IEEE Access, Aug. 6, 2019, pp. 108101-108115, Volume-issue number(s): vol. 7, 2019, Publisher: IEEE, https://ieeexplore.ieee.org/stamp/stamp.jsp?tp=&arnumber=8789419.

Lan Vu et al. "Efficient Algorithms for Mining Frequent Patterns from Sparse and Dense Databases," Journal of Intelligent Systems, Sep. 19, 2014, Walter de Gruyter GmbH, https://www.degruyter.com/document/doi/10.1515/jisys-2014-0040/html?lang=en.

Yuxuan Li et al. "Mining Probabilistic Frequent Spatio-Temporal Sequential Patterns with Gap Constraints from Uncertain Databases," 2013 IEEE 13th International Conference on Data Mining, Date: Dec 7-10, 2013, IEEE, https://citeseerx.ist.psu.edu/viewdoc/download?doi=10.1.1.639.8041&rep=rep1&type=pdf.

Daniela Grigori et al. Improving Business Process Quality through Exception Understanding, Prediction, and Prevention, VLDB 2001, Proceedings of 27th International Conference on Very Large Data Base, Sep. 11-14, 2001, pp. 159-168, Volume-issue number(s): Morgan Kaufmann, https://www.vldb.org/conf/2001/P159.pdf.

Zhenyi Zhao et al., "An improved association rule mining algorithm for large data," Journal of Intelligent Systems, Jun. 3, 2021, Volume-issue number(s): vol. 30 Issue 1, Publisher: Walter de Gruyter GmbH, https://www.degruyter.com/document/doi/10.1515/jisys-2020-0121/html?lang=en.

Mrinalini Rana et al. "A Systematic Review on Data Mining Rules Generation Optimizing via Genetic Algorithm," Proceedings of the International Conference on Innovative Computing & Communications (ICICC) 2020, Mar. 30, 2020, Springer Nature, https://papers.ssrn.com/sol3/papers.cfm?abstract_id=3564032.

Jamolbek Mattiev et al, Coverage-Based Classification Using Association Rule Mining, Applied Sciences, Oct. 9, 2020, Volume-issue number(s): vol. 10 Issue 20 , Applied Sciences, https://www.mdpi.com/2076-3417/10/20/7013.

* cited by examiner

METHOD AND SYSTEM FOR EXCEPTION MANAGEMENT

PRIORITY CLAIM

This U.S. patent application claims priority under 35 U.S.C. § 119 to: India Application No. 202221037124, filed on Jun. 28, 2022. The entire contents of the aforementioned application are incorporated herein by reference.

TECHNICAL FIELD

The disclosure herein generally relates to analyzing process exceptions, and, more particularly, to a method and system for generating a data model to analyze and predict process exceptions.

BACKGROUND

Business processes often do not follow a straight-through processing and observe exceptions. These exceptions lead to delayed processing, financial penalties, and poor customer experience.

The inventors here have recognized several technical problems with such conventional systems, as explained below. Current methods are reactive, manual, and intuition-driven. Command center teams often react to such exceptions. They also use Business intelligence (BI) tools which only provide statistical observation, but fail to mine domain-aware insights and actionable recommendations.

SUMMARY

Embodiments of the present disclosure present technological improvements as solutions to one or more of the above-mentioned technical problems recognized by the inventors in conventional systems. For example, in one embodiment, a processor implemented method of generating a data model for exception management is provided. The method involves obtaining exception data corresponding to a plurality of exceptions as input data, wherein the exception data comprising a) date of exception, b) type of exception, and c) a plurality of attributes of exception. Further, a plurality of data properties and a plurality of quality properties of the exception data are generated by executing a plurality of classification algorithms on the obtained exception data. Further, an algorithm matching the obtained exception data is determined based on the data properties and the quality properties. Further, a data model is generated by using a) the data properties, b) the quality properties, and c) information on the algorithm matching the obtained exception data, of the plurality of exceptions, as training data.

In another embodiment, determining the algorithm matching the obtained exception data includes the following steps. A classification with entropy is selected as the algorithm if the data properties and the quality properties indicate that the exception has dimension exceeding a threshold of dimension and has a highly skewed population. A classification with gini index is selected as the algorithm if the data properties and the quality properties indicate that the exception has dimension below a threshold of dimension and has a uniform population. Regression trees is selected as the algorithm if numeric attributes in the exception exceeds a threshold of numeric attributes. Classification and regression trees (CART) is selected as the algorithm if the exception contains a mix of attributes.

In yet another embodiment, the data model is used to derive one or more actionable recommendations by executing the following steps. Initially, at least one rule and corresponding data properties and quality properties are fetched as input. Further, at least one exception associated with the at least one rule is identified, by processing the input using the data model. Further, a root cause analysis of the identified at least one exception is performed to identify at least one cause of the identified at least one exception, using the data model. Further, a categorization of the at least one cause is performed as related to one of a) process improvements, or b) potential mavericks, using the data model. Further, at least one recommendation is generated based on the categorization of the at least one cause.

In yet another embodiment, a system for generating a data model for exception management is provided. The system includes one or more hardware processors, a communication interface, and a memory storing a plurality of instructions. The plurality of instructions when executed, cause the one or more hardware processors to initially obtain exception data corresponding to a plurality of exceptions as input data, wherein the exception data comprising a) date of exception, b) type of exception, and c) a plurality of attributes of exception. The system then generates a plurality of data properties and a plurality of quality properties of the exception data by executing a plurality of classification algorithms on the obtained exception data. The system further determines an algorithm matching the obtained exception data, based on the data properties and the quality properties. The system then generates the data model by using a) the data properties, b) the quality properties, and c) information on the algorithm matching the obtained exception data, of the plurality of exceptions, as training data.

In yet another embodiment, the one or more hardware processors of the system are configured to determine the algorithm matching the obtained exception data as below. A classification with entropy is selected as the algorithm if the data properties and the quality properties indicate that the exception has dimension exceeding a threshold of dimension and has a highly skewed population. A classification with gini index is selected as the algorithm if the data properties and the quality properties indicate that the exception has dimension below a threshold of dimension and has a uniform population. Regression trees is selected as the algorithm if numeric attributes in the exception exceeds a threshold of numeric attributes. Classification and regression trees (CART) is selected as the algorithm if the exception contains a mix of attributes.

In yet another embodiment, the one or more hardware processors are configured to derive one or more actionable recommendations using the data model, by executing the following steps. Initially, at least one rule and corresponding data properties and quality properties are fetched as input. Further, at least one exception associated with the at least one rule is identified, by processing the input using the data model. Further, a root cause analysis of the identified at least one exception is performed to identify at least one cause of the identified at least one exception, using the data model. Further, a categorization of the at least one cause is performed as related to one of a) process improvements, or b) potential mavericks, using the data model. Further, at least one recommendation is generated based on the categorization of the at least one cause.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
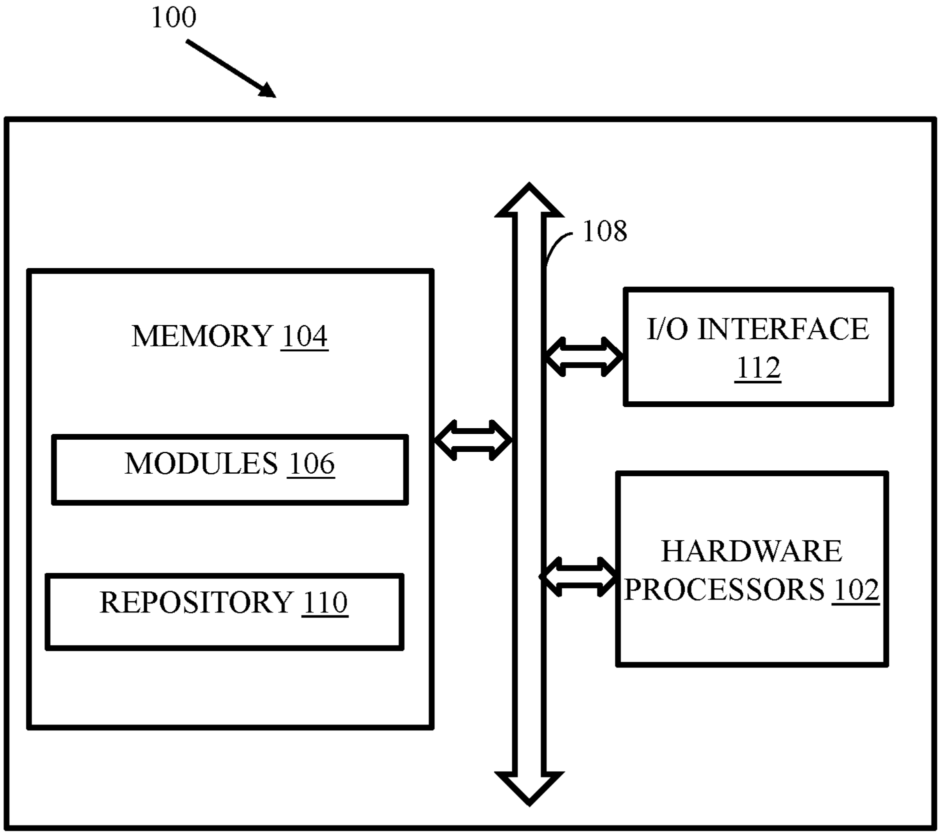
FIG. 1 illustrates an exemplary system for handling exceptions, according to some embodiments of the present disclosure.

Exemplary embodiments are described with reference to the accompanying drawings. \ In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Business process often do not follow a straight-through processing and observe exceptions. These exceptions lead to delayed processing, financial penalties, and poor customer experience. Current methods are reactive, manual, and intuition-driven. Command center teams often react to such exceptions. They also use Business intelligence (BI) tools which only provide statistical observation, but fail to mine domain-aware insights and actionable recommendations.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system for handling exceptions, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the exception handling, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the exception handling.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 through FIG. 4.

Figure 2:
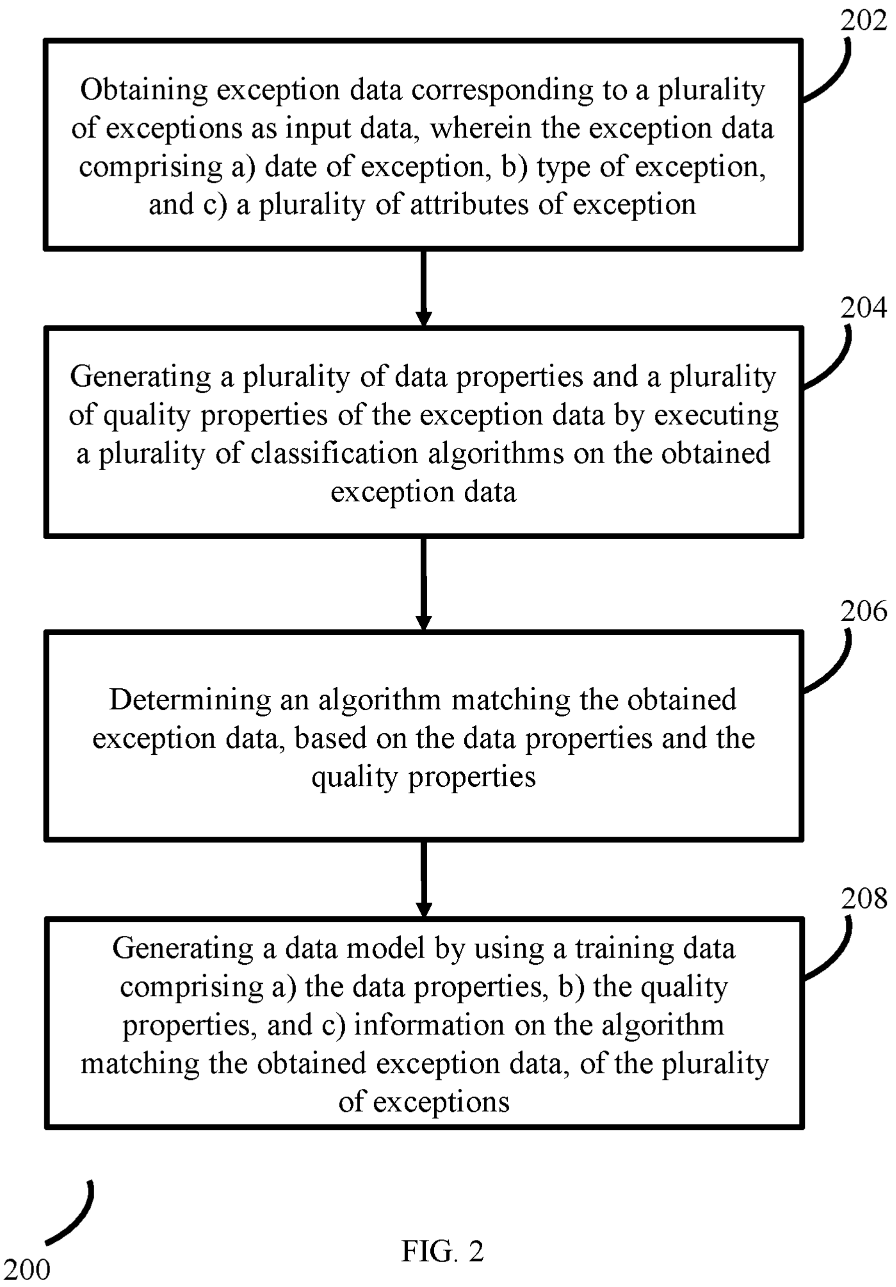
FIG. 2 is a flow diagram depicting steps involved in the process of handling exceptions, by the system of FIG. 1, according to some embodiments of the present disclosure.
Figure 3:
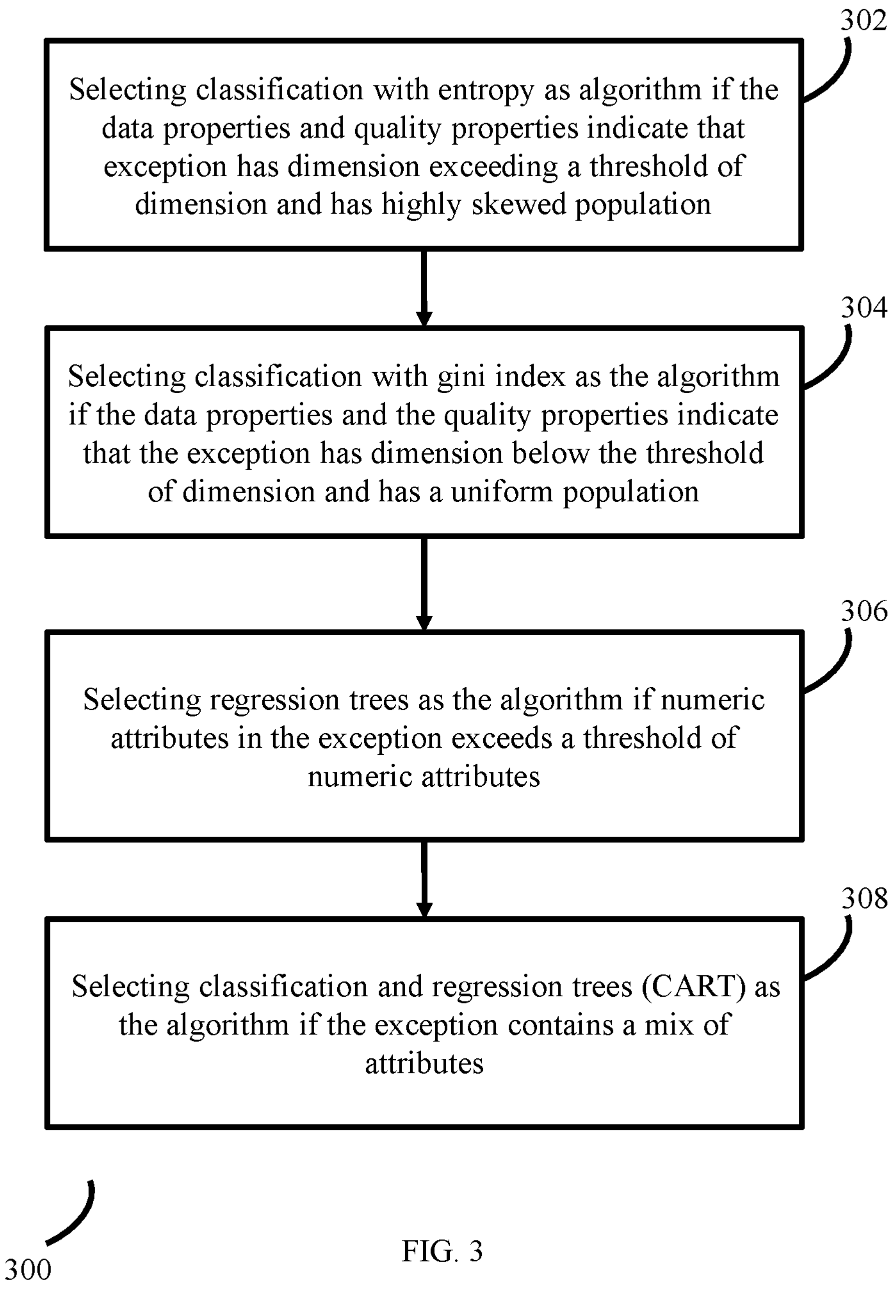
FIG. 3 is a flow diagram depicting steps involved in the process of selecting an algorithm matching the exceptions, by the system of FIG. 1, in accordance with some embodiments of the present disclosure.
Figure 4:
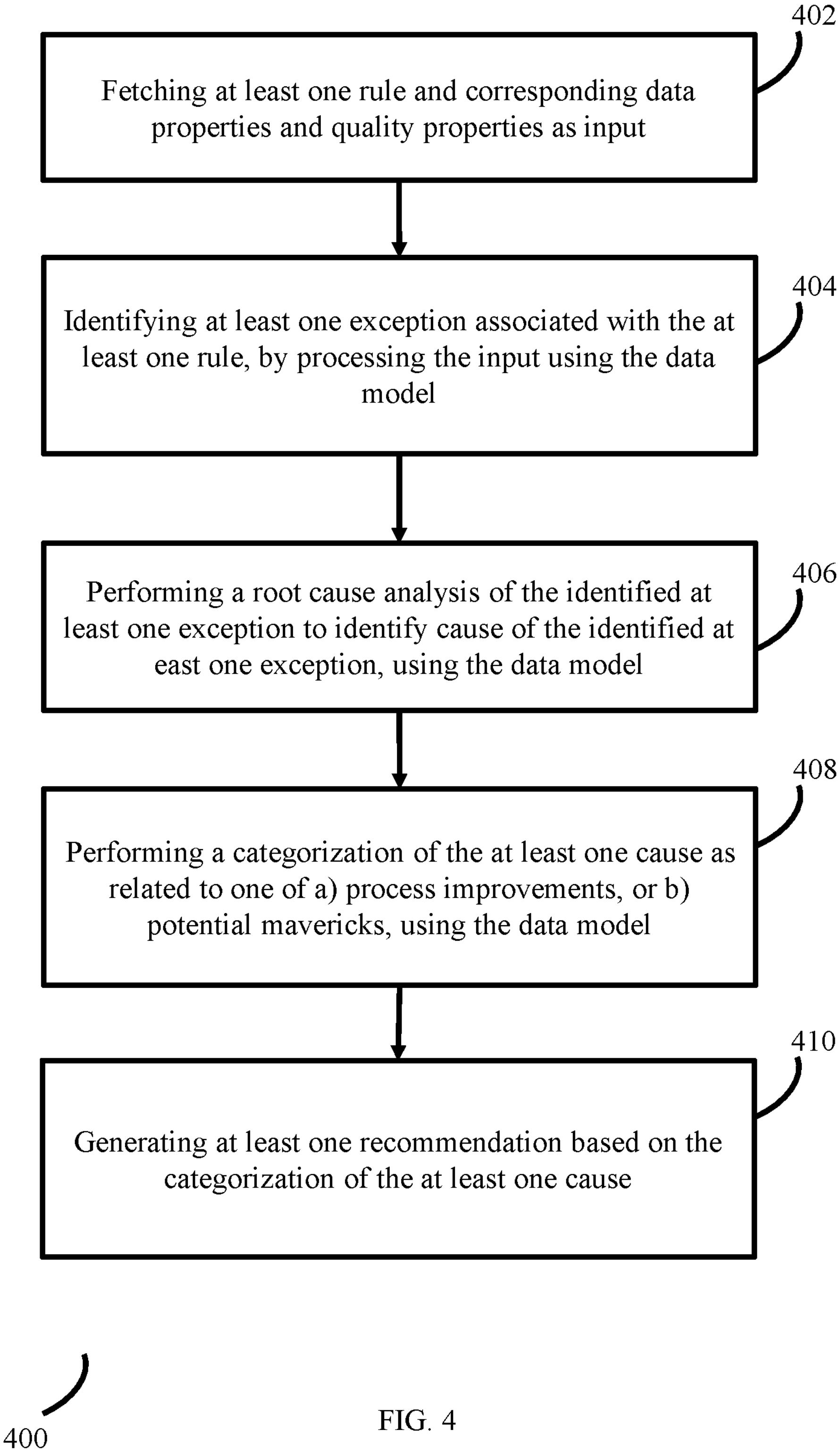
FIG. 4 is a flow diagram depicting steps involved in the process of processing real-time data for exception handling, using a data model, by the system of FIG. 1, according to some embodiments of the present disclosure.

FIG. 2 is a flow diagram of a method 200 depicting steps involved in the process of according to some embodiments of the present disclosure. In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 obtains exception data corresponding to a plurality of exceptions as input data, wherein the exception data comprising a) date of exception, b) type of exception, and c) a plurality of attributes of exception. For example, if a supply chain management is considered, the exception data may be transaction failure as type of exception, date of the transaction which failed, as the date of exception, and attributes of the transaction such as vendor name, buyer name, item name, and delivery location and so on, as the plurality of attributes of exception. Further, at step 204 of the method 200, the system 100 generates a plurality of data properties and a plurality of quality properties by executing a plurality of classification algorithms on the obtained exception data. An example of output of the classification algorithm is in the format {Attribute1=Value1 & Attribute2=value2 . . . } then {Exception=exception1}. Here first part of the pattern is termed as antecedent, which contains a set of attributes and second part is termed as Exception. Wherein data properties include i) Data dimension count—number of attribute columns in the exception data ii) Data distribution or skewness score—computed using entropy of attribute columns, and iii) Numeric attribute count—Number of attribute columns with type numeric. Example of such attributes are age column, price column, distance columns and so on. The properties contributing to the quality properties are i) Coverage—Coverage of pattern is calculated as "Number of exception data rows that holds true for the pattern/total number of rows in the exception data", ii) Confidence—patterns confidence is computed as "Number of input exception data rows which hold true for antecedent/Number of exception data rows holds true for complete pattern". To compute the next two attributes at any stage, the system 100 creates N equal duration buckets of the complete exception data duration using its date column (maximum date in exception—minimum date in exception)/N, iii) Persistence—is computed using Number of duration buckets the pattern occurrence are present in/N (total number of duration buckets), and iv) Recency is computed as "Last observed duration bucket number/N (total number of duration buckets)". Further, at step 206 of the method 200, the system 100 determines an algorithm matching the obtained exception data, based on the data properties and the quality properties. Various steps involved in the process of determining the algorithm, matching the obtained exception data, are depicted in a method 300 in FIG. 3, and are explained hereafter. As depicted in step 302 of the method 300, the system 100 selects, classification with entropy as the algorithm if the data properties indicate that the exception has dimension count exceeding a threshold of dimension and has a highly skewed population i.e., a high skewness score. As depicted in step 304 of the method 300, the system 100 selects classification with gini index as the algorithm if the data properties indicate that the exception has dimension count below a threshold of dimension and has a uniform population i.e., a low skewness score. As depicted in step 306 of the method 300, the system 100 selects, regression trees as the algorithm if numeric attributes count in the exception data exceeds a threshold of numeric attributes. Similarly, as depicted in step 308 of the method 300, the system 100 selects classification and regression trees (CART) as the algorithm if the exception contains a mix of attributes i.e., having moderate numeric attributes count. Though the selection of different algorithms are depicted in sequential manner in FIG. 3, it is to be noted that the system 100 may select only one algorithm that matches any of the aforementioned criteria. In case the system selects/identifies more than one algorithm those matches the aforementioned criteria, the system 100 further uses the quality attributes to select the best algorithm. At this step, the system 100 compares the quality attributes of the selected algorithms, and selects the algorithm having comparatively better quality attributes, as the algorithm matching the obtained exception data. Upon selection of the best algorithm, further, at step 208 of the method 200, the system 100 generates the data model by using a) the data properties, b) the quality properties, and c) information on the algorithm matching the obtained exception data, of the plurality of exceptions, as training data. The data model generated post training may contain mapping of different data properties and quality properties of different rules against corresponding exceptions determined/identified.

Once the data model is generated, the system 100 may use the data mode to derive one or more actionable recommendations. Steps in deriving the actionable recommendations are depicted in method 400 in FIG. 4. At step 402 of the method 400, the system 100 fetches at least one rule and corresponding data properties and quality properties as input. The system 100 compares the fetched at least one rule and corresponding data properties and quality properties with the data in the data model, and based on a match found, identifies at least one exception associated with the at least one rule at step 404 of the method 400. After identifying at least one exception, further at step 406 of the method 400, the system 100 performs a root cause analysis on derived rules to identify the dominant attributes, to identify at least one cause of the identified at least one exception, using the data model. The system 100 performs the root cause analysis using the data model as follows. Every pattern identified has at least one attribute in antecedent and one exception. Example pattern in above supply chain case is when {Buyer=B1(attribute) and Vendor=V2(attribute)} then {Transaction error=Price Miss Match (exception)}. The system 100 takes all these patterns as input to generate probable root causes for each exception. For each pattern, the system 100 identifies dominant attributes, which involves eliminating each attribute from the pattern and recomputing the quality attributes of the pattern to obtain an updated pattern. If the quality parameters of the updated pattern is less than a defined threshold, then the system 100 marks that attribute as a probable root cause. E.g., In the above case pattern, if the system 100 removes vendor=V2 and the remaining patterns quality parameters are less than the threshold, then the system 100 determines Vendor=V2 as the probable cause for exception=Price Miss Match. After identifying the at least one root cause, at step 408 of the method 400, the system 100 performs a categorization of the at least one cause as related to one of a) process improvements, or b) potential mavericks. At this step, the system 100 applies thresholds on quality attributes of the pattern and categorize them into one of process improvements or potential mavericks. If the quality attributes of the pattern coverage, confidence and persistence are higher than the corresponding threshold, then the system 100 determines the pattern as recommendation for process improvement. If the confidence of the pattern is high and its coverage and persistence are low then that pattern is considered as recommendation for potential mavericks. Further, at step 410 of the method 400, the system 100 generates at least one recommendation based on the categorization of the at least one cause.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of generating a data model for exception management, comprising:

obtaining exception data corresponding to a plurality of exceptions as input data, wherein the exception data comprises a) date of exception, b) type of exception, and c) a plurality of attributes of exception;

generating a plurality of data properties and a plurality of quality properties of the exception data by executing a plurality of classification algorithms on the obtained exception data;

determining an algorithm matching the obtained exception data, based on the data properties and the quality properties, wherein when more than one algorithm is selected or identified, then the quality attributes of the selected algorithms are compared, and selects the algorithm having better quality attributes, as the algorithm matching the obtained exception data;

generating the data model utilizing a training data comprising a) the data properties, b) the quality properties, and c) information on the algorithm matching the obtained exception data;

deriving one or more actionable recommendations using the data model by:

fetching at least one rule and corresponding data properties and quality properties as input;

identifying at least one exception associated with the at least one rule, by processing the input using the data model;

performing a root cause analysis of the identified at least one exception to identify at least one root cause of the identified at least one exception, using the data model, wherein the root cause analysis to identify the at least one root cause is performed by identifying at least one attribute in antecedent and one exception for every pattern and for each pattern, dominant attributes are identified by eliminating each attribute from the pattern and recomputing the quality attributes of the pattern to obtain an updated pattern and when the updated pattern is less than a defined threshold, then that attribute as a probable root cause;

performing a categorization of the at least one root cause as related to one of a) process improvements, or b) potential mavericks, using the data model; and generating at least one actionable recommendation based on the categorization of the at least one cause, wherein if the quality attributes of a pattern coverage, confidence and persistence are higher than the corresponding threshold then a process is recommended for process improvement and if the confidence of the pattern is high and its coverage and persistence are low then that pattern is considered as a recommendation for potential mavericks; and implementing, the at least one actionable recommendation based on the identified at least one root cause for exception management.

2. The method of claim 1, wherein the plurality of data properties include i) data dimension count-number of attribute columns in the exception data ii) data distribution or skewness score-computed using entropy of attribute columns, and iii) numeric attribute count-number of attribute columns with type numeric, wherein the plurality of quality properties are i) coverage—coverage of pattern is calculated as number of exception data rows that holds true for the pattern/total of rows in the exception data, ii) confidence—pattern of confidence is computed as number of input exception data rows which hold true for antecedent part of pattern or number of input exception data rows holds true for complete pattern, iii) persistence is computed using number of duration buckets the pattern occurrence are present/total number of duration buckets, and iv) recency is computed as last observed duration bucket number/total number of duration buckets, wherein the data model generated post training contains mapping of different data properties and the quality properties of different rules against corresponding determined exceptions.

3. The method of claim 1, wherein determining the algorithm matching the obtained exception data comprises:

selecting classification with entropy as the algorithm if the data properties and the quality properties indicate that the exception has dimension exceeding a threshold of dimension and has a highly skewed population;

selecting classification with gini index as the algorithm if the data properties and the quality properties indicate that the exception has dimension below a threshold of dimension and has a uniform population;

selecting regression trees as the algorithm if numeric attributes in the exception exceeds a threshold of numeric attributes; and selecting classification and regression trees (CART) as the algorithm if the exception contains a mix of attributes.

4. A system for generating a data model for exception management, comprising:

one or more hardware processors;

a communication interface; and a memory storing a plurality of instructions, wherein the plurality of instructions when executed, cause the one or more hardware processors to:

obtain exception data corresponding to a plurality of exceptions as input data, wherein the exception data comprises a) date of exception, b) type of exception, and c) a plurality of attributes of exception;

generate a plurality of data properties and a plurality of quality properties of the exception data by executing a plurality of classification algorithms on the obtained exception data;

determine an algorithm matching the obtained exception data, based on the data properties and the quality properties, wherein when more than one algorithm is selected or identified, then the quality attributes of the selected algorithms are compared, and selects the algorithm having better quality attributes, as the algorithm matching the obtained exception data;

generate the data model utilizing a training data comprising a) the data properties, b) the quality properties, and c) information on the algorithm matching the obtained exception data;

derive one or more actionable recommendations using the data model by:

fetching at least one rule and corresponding data properties and quality properties as input;

identifying at least one exception associated with the at least one rule, by processing the input using the data model;

performing a root cause analysis of the identified at least one exception to identify at least one root cause of the identified at least one exception, using the data model, wherein the root cause analysis to identify the at least one root cause is performed by identifying at least one attribute in antecedent and one exception for every pattern and for each pattern, dominant attributes are identified by eliminating each attribute from the pattern and recomputing the quality attributes of the pattern to obtain an updated pattern and when the updated pattern is less than a defined threshold, then that attribute as a probable root cause:

performing a categorization of the at least one root cause as related to one of a) process improvements, or b) potential mavericks, using the data model; and generating at least one actionable recommendation based on the categorization of the at least one root cause, wherein if the quality attributes of a pattern coverage, confidence and persistence are higher than the corresponding threshold then a process is recommended for process improvement and if the confidence of the pattern is high and its coverage and persistence are low then that pattern is considered as a recommendation for potential mavericks; and implement, the at least one actionable recommendation based on the identified at least one root cause for exception management.

5. The system of claim 4, wherein the plurality of data properties include i) data dimension count—number of attribute columns in the exception data ii) data distribution or skewness score—computed using entropy of attribute columns, and iii) numeric attribute count—number of attribute columns with type numeric, wherein the plurality of quality properties are i) coverage—coverage of pattern is calculated as number of exception data rows that holds true for the pattern/total number of rows in the exception data, ii) confidence—pattern of confidence is computed as number of input exception data rows which hold true for antecedent part of pattern or number of input exception data rows holds true for complete pattern, iii) persistence is computed using number of duration buckets the pattern occurrence are present/total number of duration buckets, and iv) recency is computed as last observed duration bucket number/total number of duration buckets, wherein the data model generated post training contains mapping of different data properties and the quality properties of different rules against corresponding determined exceptions.

6. The system of claim 4, wherein the one or more hardware processors are configured to determine the algorithm matching the obtained exception data, by:

selecting classification with entropy as the algorithm if the data properties and the quality properties indicate that the exception has dimension exceeding a threshold of dimension and has a highly skewed population;

selecting classification with gini index as the algorithm if the data properties and the quality properties indicate that the exception has dimension below a threshold of dimension and has a uniform population;

selecting regression trees as the algorithm if numeric attributes in the exception exceeds a threshold of numeric attributes; and selecting classification and regression trees (CART) as the algorithm if the exception contains a mix of attributes.

7. One or more non-transitory machine-readable information storage mediums comprising one or more instructions which when executed by one or more hardware processors cause:

obtaining exception data corresponding to a plurality of exceptions as input data, wherein the exception data comprises a) date of exception, b) type of exception, and c) a plurality of attributes of exception;

generating a plurality of data properties and a plurality of quality properties of the exception data by executing a plurality of classification algorithms on the obtained exception data;

determining an algorithm matching the obtained exception data, based on the data properties and the quality properties, wherein when more than one algorithm is selected or identified, then the quality attributes of the selected algorithms are compared, and selects the algorithm having better quality attributes, as the algorithm matching the obtained exception data;

generating the data model utilizing a training data comprising a) the data properties, b) the quality properties, and c) information on the algorithm matching the obtained exception data;

deriving one or more actionable recommendations using the data model by:

fetching at least one rule and corresponding data properties and quality properties as input;

identifying at least one exception associated with the at least one rule, by processing the input using the data model;

performing a root cause analysis of the identified at least one exception to identify at least one root cause of the identified at least one exception, using the data model, wherein the root cause analysis to identify the at least one root cause is performed by identifying at least one attribute in antecedent and one exception for every pattern and for each pattern, dominant attributes are identified by eliminating each attribute from the pattern and recomputing the quality attributes of the pattern to obtain an updated pattern and when the updated pattern is less than a defined threshold, then that attribute as a probable root cause;

performing a categorization of the at least one root cause as related to one of a) process improvements, or b) potential mavericks, using the data model; and generating at least one actionable recommendation based on the categorization of the at least one root cause, wherein if the quality attributes of a pattern coverage, confidence and persistence are higher than the corresponding threshold then a process is recommended for process improvement and if the confidence of the pattern is high and its coverage and persistence are low then that pattern is considered as a recommendation for potential mavericks; and implementing, the at least one actionable recommendation based on the identified at least one root cause for exception management.

8. The one or more non-transitory machine-readable information storage mediums of claim 7, wherein the plurality of data properties include i) data dimension count—number of attribute columns in the exception data ii) data distribution or skewness score—computed using entropy of attribute columns, and iii) numeric attribute count—number of attribute columns with type numeric, wherein the plurality of quality properties are i) coverage—coverage of pattern is calculated as number of exception data rows that holds true for the pattern/total number of rows in the exception data, ii) confidence—patterns confidence is computed as number of input exception data rows which hold true for antecedent part of pattern or number of input exception data rows holds true for complete pattern, iii) persistence is computed using number of duration buckets the pattern occurrence are present/total number of duration buckets, and iv) recency is computed as last observed duration bucket number/total number of duration buckets, wherein the data model generated post training contains mapping of different data properties and the quality properties of different rules against corresponding determined exceptions.

9. The one or more non-transitory machine-readable information storage mediums of claim 7, wherein determining the algorithm matching the obtained exception data comprises:

selecting classification with entropy as the algorithm if the data properties and the quality properties indicate that the exception has dimension exceeding a threshold of dimension and has a highly skewed population;

selecting classification with gini index as the algorithm if the data properties and the quality properties indicate that the exception has dimension below a threshold of dimension and has a uniform population;

selecting regression trees as the algorithm if numeric attributes in the exception exceeds a threshold of numeric attributes; and selecting classification and regression trees (CART) as the algorithm if the exception contains a mix of attributes.

* * * * *